United States Patent [19]

Woods et al.

[11] 4,418,901

[45] Dec. 6, 1983

[54] VISE SYSTEM

[75] Inventors: William D. Woods; John H. Pigman, both of Phoenix, Ariz.

[73] Assignee: International Design Corporation, Phoenix, Ariz.

[21] Appl. No.: 256,258

[22] Filed: Apr. 22, 1981

[51] Int. Cl.[3] .................... B23Q 1/04

[52] U.S. Cl. .................... 269/71; 269/82; 269/101; 269/251

[58] Field of Search .................... 269/45, 74, 81-85, 269/97-101, 152-155, 104, 240, 246-253, 71, 73, 900, 76

[56] References Cited

U.S. PATENT DOCUMENTS

| | | | |
|---|---|---|---|
| 1,875,761 | 9/1932 | Power | 269/45 |
| 1,987,826 | 1/1935 | Hevmann | 269/152 |
| 2,204,837 | 6/1940 | Waller | 269/84 |
| 2,207,881 | 7/1940 | Smith | 269/85 |
| 2,324,803 | 7/1943 | Laverne | 269/152 |
| 2,633,764 | 4/1953 | Ruser | 269/82 |
| 2,823,567 | 2/1958 | Pothier | 269/76 |
| 3,168,893 | 2/1965 | Johnson | 269/71 |
| 3,176,745 | 4/1965 | Nyborg | 269/246 |
| 3,883,128 | 5/1975 | Breese | 269/45 |
| 4,002,328 | 1/1977 | Wolf et al. | 269/246 |
| 4,157,819 | 6/1979 | Meyer | 269/900 |

*Primary Examiner*—Robert C. Watson
*Attorney, Agent, or Firm*—LaValle D. Ptak

[57] ABSTRACT

The vise system has a bracket section which can be secured to any flat horizontal work surface, particularly a drill press platen, with sliding and rotating degrees of freedom with respect to a bracket bolt. The bracket bolt threads into a hole in the work surface and can tighten down to rigidly hold the bracket section in position. A vise section, capable of clamping a work piece between fixed and movable jaws, is connected to the bracket section by a horizontally-oriented connecting bolt, about which the vise section can rotate, and which can be tightened to secure the vise section at any selected angle. The vise section has a rectangular cross-section, facilitating rapid self-indexing of angles 0, 90, 180, and 270 degrees with respect to the bracket section. The vise system is capable of being pivoted to a position in which the vise section extends beyond the edge of the work surface in order to accommodate work pieces in orientations which would otherwise interfere with the work surface. The vise system can be removed from or attached to a variety of work surfaces by loosening the bracket bolt without removing it from the surface, and with the vise section still clamping a work piece.

11 Claims, 7 Drawing Figures

VISE SYSTEM

FIELD OF THE INVENTION

The invention relates to vises, and particularly to vises which can securely hold a work piece in a wide range of positions and angles in relation to a flat horizontal work surface such as the platen of a drill press.

DISCUSSION OF RELEVANT ART

It is frequently desirable in mechanical work to hold a work piece securely in a variety of positions, particularly to permit the accurate drilling of holes using a drill press. It is often necessary to drill holes perpendicular to a particular plane surface of an irregularly-shaped work piece, or into the end of an elongated work piece, or into a surface at angles other than 90 degrees. To accomplish these operations accurately requires a vise capable of being fastened securely with reference to the drill press platen in a wide range of positions, and which is also pivotable about a horizontal axis. A number of pivotable clamping devices are known, including those disclosed in U.S. Pat. Nos. 2,633,764; 3,051,473; 3,675,916; and 4,002,328. Of these Pat. No. 2,633,764, issued to Ruser, Apr. 7, 1953, has the most in common with the present invention. The Ruser patent discloses a vise with a pivoting connection at opposite ends to a support. The support is held by a pair of elongated arms to a clamping bar which has a sliding engagement with the arms and can be tightened to secure the support against a drill press platen, and thereby secure the vise in a variety of positions on the surface of the platen. The support can also be moved beyond the edge of the platen, permitting the vise to be rotated to a 90 degree angle from its position on the platen to allow drilling into the ends of elongated work pieces. The Ruser patent, although it does clamp a work piece in a variety of positions on the platen, does not disclose a devise capable of establishing the high degree of stability required to resist the forces inherent in a drilling operation which is intended to produce dimensionlly accurate holes, particularly in the off-platen mode of operation. In addition, Ruser does not address the problem of positioning an irregularly-shaped work piece in order to drill a hole perpendicular to any flat surface, or of drilling accurate holes at angles other than 90 degrees. There is clearly an unmet need for an inexpensive, high precision vise which can be rapidly deployed to hold a work piece in a wide range of orientations in relation to a flat work surface.

OBJECTS OF THE INVENTION

It is an object of the invention to provide a vise system which is capable of rapid deployment to securely position a work piece in a wide variety of positions over a flat horizontal work surface.

It is another object of the invention to provide a vise system capable of extending beyond the edge of a flat horizontal work surface to accommodate work pieces in orientations which would otherwise cause interference between the work piece and the work surface.

It is yet another object of the invention to provide a vise system which is capable of securely holding a work piece at a wide range of angles with reference to a drill press spindle while fastened to the platen of the drill press.

It is also an object of the invention to provide a vise system which is capable of accurately locating a flat surface of an irregularly-shaped work piece to permit the drilling of holes by a drill press at precise angles in or with respect to that flat surface.

It is an additional object of the invention to provide a vise system which is capable of accurately and securely positioning a work piece in a wide range of angular relationships with respect to a flat horizontal work surface.

It is a further object of the invention to provide a vise system which has accurate self-indexing surfaces so that a work piece may be rapidly, accurately, and securely positioned to angles of 0, 90, 180, and 270 degrees with respect to a flat horizontal work surface.

It is still another object of the invention to provide a vise system which is rapidly removable from and attachable to a wide variety of flat horizontal work surfaces without necessitating the removal of a work piece from the vise.

An additional object of the invention is to provide a vise system which is configured so as to be usable as a drill fence, whereby a series of holes can be drilled in a work piece at an exactly constant distance from any straight edge of the work piece.

SUMMARY OF THE INVENTION

The invention, a vise system, is a clamping device for holding work pieces in a wide range of secured positions and angles with respect to a flat horizontal work surface. The vise system has two sections: a bracket section having a pivoting and sliding adjustment with reference to a bracket bolt threaded into the work surface, which bracket section can be securely fastened to the work surface in a desired position by tightening the bracket bolt; and a vise section which can hold a work piece clamped between a fixed jaw and a movable jaw. The movable jaw slides on slide surfaces of two way members. The slide surfaces also serve to accurately locate any flat surface of a work piece.

The bracket section has a flat end surface which mates with a mating surface on the vise section. The flat end surface and mating surface are both machined to be perpendicular to the work surface. The sections of the vise system are connected together by means of a connecting bolt so as to permit rotation, which connecting bolt projects through a vertical slot in the bracket end piece and threads into a hole in the fixed jaw of the vise section, and which securely holds the sections together in any angular relationship when tightened.

The vise section has four machined surfaces to produce self-indexing angles of 0, 90, 180, and 270 degrees between the plane of the slide surfaces and the work surface when the vise section is made to rest on each of the four machined surfaces, respectively.

DESCRIPTION OF THE INVENTION

Figure 1:
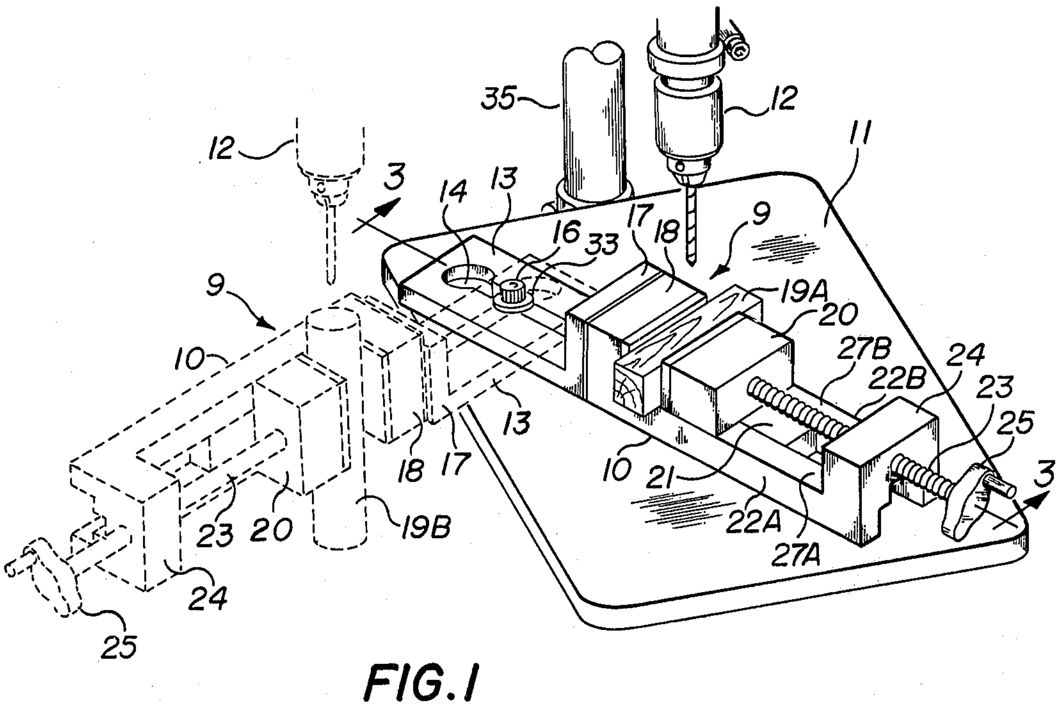
FIG. 1 is an isometric view of the vise system attached to the platen of a drill press, showing two alternative modes of operation.

Referring now to the drawings, FIGS. 1, 2, 6, and 7 all show the vise system 9 attached to the platen 11 of a drill press, of which only the drill press quill 12 and the support column 35 are shown. The vise system 9 is attached to the platen 11 at the L-shaped bracket section 13. To accomplish this, the bracket bolt 16, connected to its washer 33, is partially threaded into a hole in the platen 11. The circular opening 14 in the base of the bracket section 13, which is of slightly larger diameter than the washer 33, is lowered over the bracket bolt 16 and its washer 33, and the vise system 9 is pushed along the platen 11 toward the bracket bolt 16 so as to engage the shaft of the bracket bolt 16 in the elongated slot 15. When the bracket bolt 16 is then tightened, the bracket section 13, and thereby the entire vise system 9, is securely and immovably clamped onto the platen 11.

Figure 3:
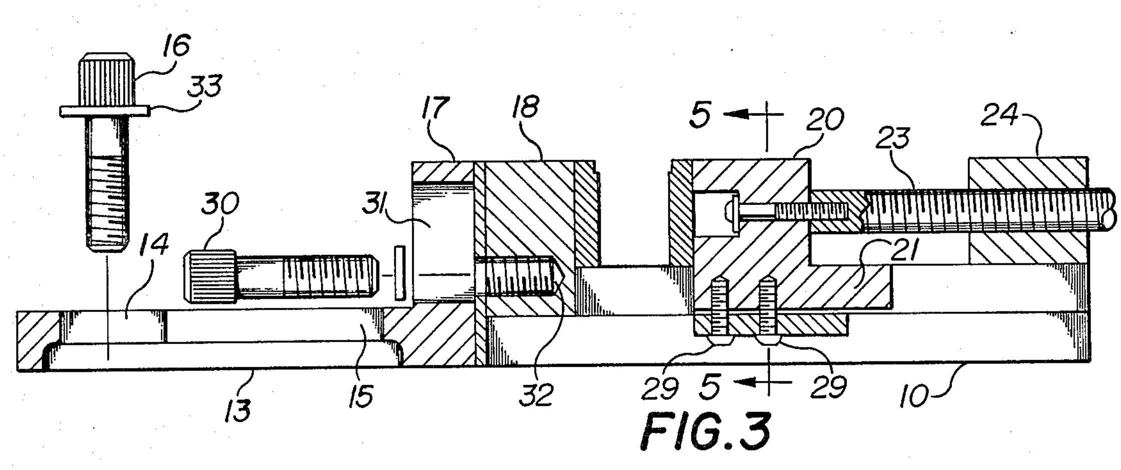
FIG. 3 is a partially disassembled section view of the vise system taken along the section line 3—3 of FIG. 1.
Figure 4:
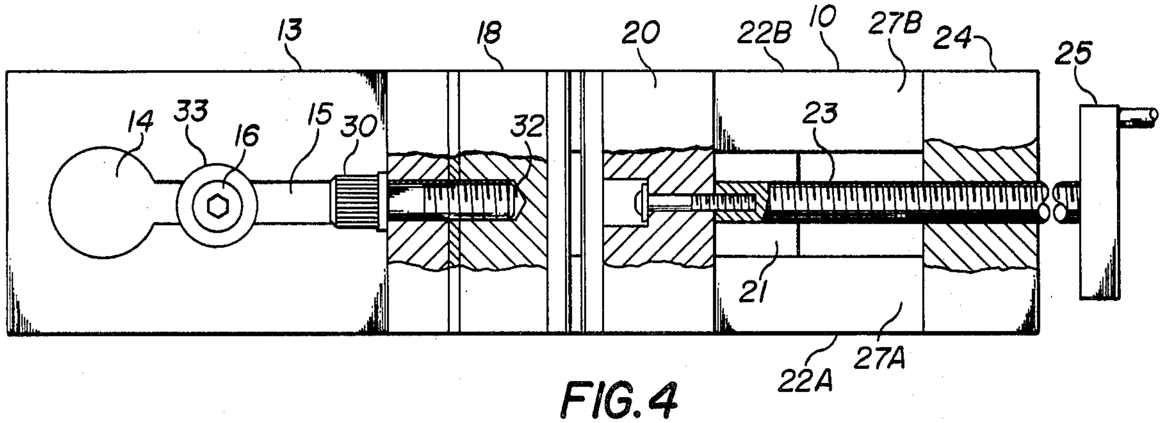
FIG. 4 is a top view of the vise system with the vise in the orientation shown in the solid-line view of FIG. 1, the work piece having been removed and the jaws somewhat closed.

The bracket section 13 is connected to the vise section 10 by the connecting bolt 30 (See FIG. 3 or 4), which threads into a hole 32 in the fixed jaw 18 of the vise section 10, and projects through a vertical slot 31 in the end piece 17 of the bracket section 13. By loosening the connecting bolt 30, the vise section 10 can be rotated through 360 degrees with relation to the bracket section 13. By raising the vise section 10 so that the head of the connecting bolt 30 is at the top of the vertical slot 31, this rotation can even be accomplished while the bracket section 13 is clamped to the platen 11.

Figure 5:
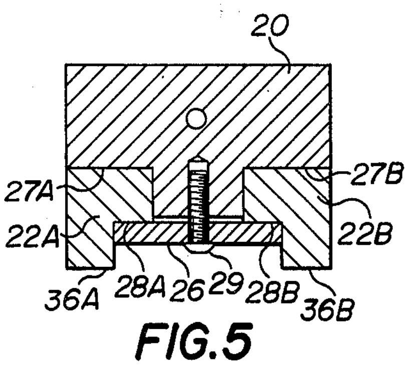
FIG. 5 is a section view taken along the section line 5—5 of FIG. 3.

In the vise section 10, a movable jaw 20 slides upon two way members 22A and 22B. The slide surfaces 27A and 27B upon which the movable jaw 20 slides are machined precisely flat and coplanar with respect to each other, and parallel to the bottom surfaces 36A and 36B of the way members 22A and 22B. The movable jaw 20 is moved toward or away from the fixed jaw 18 by turning the handle 25. Connected to the handle 25 is a threaded shaft 23 which has a rotating connection with the movable jaw 20 on the surface furthest from the fixed jaw 18, and which threads through a hole in the end plate 24 of the vise section 10. The movable jaw 20 extends down between the way members 22A and 22B, and is retained below by a retaining plate 26 by means of retaining screws 29. The retaining plate 26 slides along precisely machined retaining plate slide surfaces 28A and 28B, which are precisely flat and coplanar with respect to each other and parallel to the jaw slide surfaces 27A and 27B. An elongated tongue 21 projects between the way members 22A and 22B to maintain the parallelism of the movable jaw 20 to the fixed jaw 18 under load. Stability of the movable jaw 20 on the way members 22A and 22B is further maintained by dimensioning the movable jaw 20 so that its bottom surface does not reach to the retaining plate slide surfaces 28A and 28B. The space thereby created between the retaining plate 26 and the movable jaw 20 enables an adjustable downward loading to be established by tightening the retaining screws 29, which forces the movable jaw onto the slide surfaces 27A and 27B (See FIG. 5).

FIGS. 1, 2, 6, and 7 illustrate five of the basic modes of operation of the vise system 9. The solid-lined drawing of FIG. 1 shows a basic on-board right-side up orientation. In this mode, the vise system 9 is placed on the platen 11 with the bracket bolt 16 loosely engaging the elongated slot 15. The connecting bolt 30 is loosened, and the vise section 10 allowed to rest on the platen 11 with the bottom surfaces 36A and 36B of the way members 22A and 22B in contact with the platen 11. The connecting bolt 30 is then tightened and the work piece 19A clamped between the movable jaw 20 and the fixed jaw 18, and the work piece 19A positioned as desired under the drill press quill 12. The vise system 9 is then securely attached to the platen 11 in the desired orientation by tightening the bracket bolt 16 while the vise system 9 is stationary on the platen 11. The right-side up orientation, as any other orientation, can also be used in an off-board mode, similar to that illustrated in the phantomed-line drawing of FIG. 1 or in FIG. 2.

The phantomed-line drawing of FIG. 1 shows a 90 degree, off-board mode of operation, particularly useful for drilling into the end of a dowel or other elongated work piece. To obtain this configuration, the vise system 9 is set flat on the platen 11. The connecting bolt 30 is loosened and the vise section 10 is rotated so that it rests on one of its side surfaces which are machined to be perpendicular to the slide surfaces 27A and 27B. The connecting bolt 30 is then tightened, the platen 11 rotated out from under the drill press quill 12 and secured in place, and the vise system 9, its bracket section 13 loosely engaging the shaft of the bracket bolt 16 in the elongated slot 15, is turned so that the vise section 10 projects beyond the edge of the platen 11 beneath the drill press quill 12. The work piece 19B is then clamped between the movable jaw 20 and the fixed jaw 18, and the bracket bolt 16 tightened with the work piece 19B positioned so that the hole will be drilled at the desired location.

Figure 2:
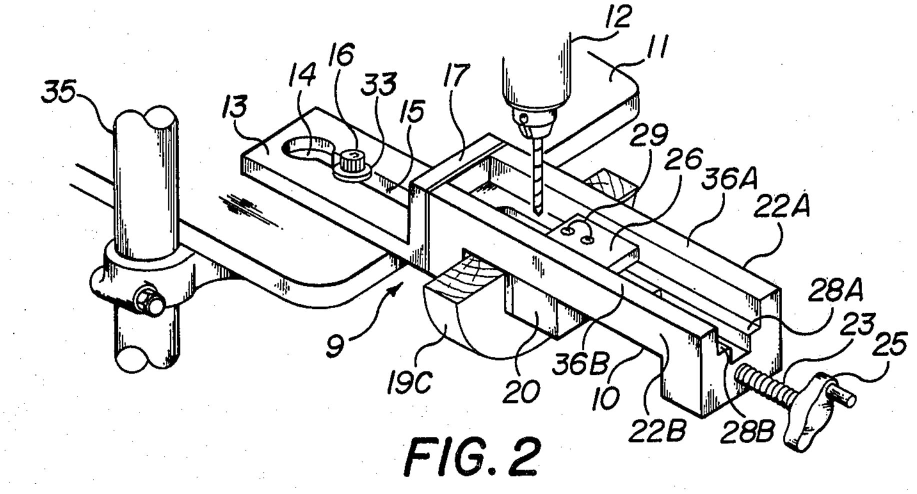
FIG. 2 is an isometric view of the vise system attached to the platen of a drill press showing another mode of operation.

The upside-down off-board mode of FIG. 2 can be used to drill perpendicular holes into a flat surface of an irregularly-shaped work piece. The top surface of the vise section 10 is machined parallel to the bottom surfaces 36A and 36B of the way members 22A and 22B. Since the jaw slide surfaces 27A and 27B are also parallel to the bottom surfaces 36A and 36B, the flat section of the work piece 19C which is located against the slide surfaces 27A and 27B is also parallel to the top of the vise section 10. To ensure that the top surface of the vise section 10, and thereby the flat surface to be drilled on the work piece 19C, is parallel to the platen 11 (and thereby perpendicular to the axis of the drill press quill 12), the connecting bolt 30 is loosened while the vise system 9 is lying flat on the platen 11, the vise section 10 is inverted so that the bottom surfaces 36A and 36B are facing up, and the connecting bolt 30 then tightened. When the vise system 9 is then oriented off-board as described above, and the work piece 19C clamped as shown, a perpendicular hole can be drilled into the surface of the work piece 19C which contacts the slide surfaces 27A and 27B. This mode, as any other, can also be used on-board, provided the work piece 19C does not interfere with the platen 11.

Figure 7:
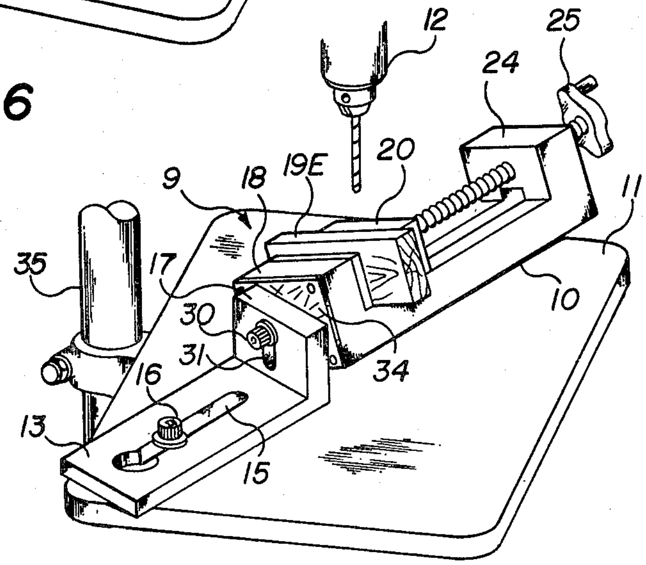
FIG. 7 is an isometric view of the vise system attached to the platen of a drill press showing yet another mode of operation.

The angle mode of FIG. 7 permits drilling at any angle into any non-clamped surface of a work piece 19E. In the illustrated mode of FIG. 7, the top surface of the work piece 19E is being drilled.

The desired angle is obtained by loosening the connecting bolt 30 while the bracket section 13 is securely clamped to the platen 11, and lifting the vise section 10 so that the connecting bolt 30 is at the top of the vertical slot 31 in the bracket end plate 17. In this position, when the vise section 10 is rotated relative to the bracket section 13, angle settings can be read off of a protractor 34 scribed into the mating surface of the vise section 10. When the desired angle is obtained, the connecting bolt 30 is tightened and the hole can be drilled.

Figure 6:
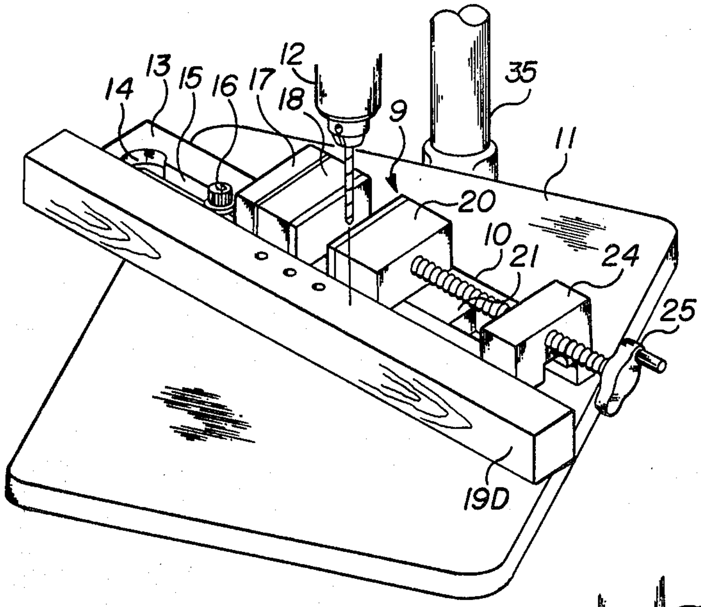
FIG. 6 is an isometric view of the vise system attached to the platen of a drill press showing an additional mode of operation.

FIG. 6 illustrates the drill fence mode of operation of the vise system 9. The vise system 9 is so constructed that when it is in the right-side up mode, the right and left side surfaces of the bracket section 13 form continuous planes with the right and left side surfaces, respectively, of the vise section 10. If one of the side surfaces thus formed is abutted against a straight edge of a work piece 19D laid on the platen 11, a series of holes can be drilled in the work piece 19D at a constant distance from the abutted straight edge by sliding the work piece 19D along the securely clamped vise system 9.

All of the modes shown in the drawings involve the platen 11 of a drill press. However, by the simple expedient of threading a bracket bolt 16 in a hole in any flat horizontal surface, such as a work bench, the vise system 9 can be used in a variety of ways, and moved, still clamping the work piece if desired, from one flat horizontal surface to another and clamped thereto.

The embodiment of the vise system shown and described is the preferred embodiment. However, other embodiments are possible which would accomplish the objects of the invention within the contemplation of the inventors. No limitations should be implied from the drawings or descriptions herein, and the scope of the invention should not be otherwise limited except as required by the scope of the appended claims.

What is claimed is:

1. A clamping device to be used in connection with a flat work surface, including in combination:

a. an L-shaped bracket section having an end piece with a flat end surface oriented perpendicular to the work surface when the base of the bracket section is resting thereon;

b. means for attaching the base of the bracket section to the work surface in a manner to allow the position of the bracket section to be rotatably adjustable in the plane of, and rigidly tightenable against, the work surface;

c. a vise section for adjustably holding a work piece, comprising:

i. a mating surface oriented perpendicular to the work surface when the vise section is resting thereon;

ii. a pair of jaw members mounted for relative movement toward and away from one another for clamping a work piece therebetween;

iii. at least first, second, and third flat surfaces on the vise section each perpendicular to the mating surface for abutment against the flat work surface, said first and third surfaces being parallel to one another and perpendicular to said second surface;

iv. a pair of parallel spaced apart way members having coplanar jaw slide surfaces thereon parallel to the second flat surface on the vise section, wherein the relative movement of the jaws is upon the coplanar jaw slide surfaces, which jaw slide surfaces extend between the jaws and constitute a flat reference surface for receiving a flat surface of a work piece; and d. means for releasably connecting the vise section to the end piece of the bracket section on the side opposite the base thereof, so that the mating surface of the vise section contacts the flat end surface of the end piece of the bracket section and the vise section is rotatably adjustable in the plane of the flat end surface of the bracket section and is rigidly tightenable against the bracket section in various rotational positions to cause different ones of said first, second, and third surfaces of said vise section to abut the flat work surface to thereby accurately index work pieces clamped between the jaw members to the flat work surface.

2. A clamping device as set forth in claim 1 further including a fourth surface on the vise section, said fourth surface being parallel to said second surface and spaced therefrom, and being perpendicular to said first and third surfaces; and wherein at least one rotational position of the vise section causes said fourth surface to abut the flat work surface.

3. A clamping device as set forth in claim 1, wherein one of said jaws is fixed and the other is movable and further including a vise end plate on the opposite end of the vise section from the fixed jaw; a threaded shaft threaded through the vise end plate, said shaft being rotatably connected at one end to the movable jaw to cause the movable jaw to move in relation to the fixed jaw when the shaft turns.

4. A clamping device as set forth in claim 3, wherein a portion of the movable jaw extends below the jaw slide surfaces and between the way members.

5. A clamping device as set forth in claim 4, wherein the portion of the movable jaw extending below the jaw slide surfaces and between the way members is an elongated tongue having a width slightly less than the distance between the way members in order to help prevent the angular relationship between the movable jaw and the fixed jaw from changing under load.

6. A clamping device as set forth in claim 4 or 5, wherein each way member has a retaining plate slide surface opposed to and parallel to the jaw slide surface, and further including a retaining plate in contact with both retaining plate slide surfaces and connected to the bottom of the movable jaw in order to prevent the movable jaw from losing contact with the jaw slide surfaces.

7. A clamping device as set forth in claim 6, wherein the bottom of the movable jaw does not extend as far as the retaining plate slide surfaces, so that a space exists between the bottom of the movable jaw and the retaining plate, and wherein the retaining plate is connected to the bottom of the movable jaw by means of a retaining screw threaded into the movable jaw and projecting through the retaining plate, whereby an adjustable downward loading of the movable jaw onto the jaw slide surfaces can be obtained by tightening the retaining screw.

8. A clamping device as set forth in claim 1, 2, 3, 4, or 5, wherein the means for attaching the bracket section to the work surface comprises: a flat portion of the bracket section having an elongated slot therethrough and an enlarged opening therethrough at one end on the elongated slot, which flat portion contacts the work surface when the bracket section rests thereon; and a bracket bolt having a head portion of diameter larger than the width of the elongated slot, which head portion can fit through the enlarged opening, and which bracket bolt threads into a hole in the work surface to permit the bracket section to be secured to the work surface by tightening the bracket bolt with the head portion over the elongated slot, and also to permit removal of the bracket section from the work surface without removing the bracket bolt therefrom by loosening the bracket bolt and lifting the bracket section up with the end of the bracket bolt fitting through the enlarged opening.

9. A clamping device as set forth in claim 1, 2, 3, 4, or 5, wherein the flat end surface of the bracket section is the outside surface of a flat end piece which has an elongated slot therethrough perpendicular to the work surface; and the means for releasably connecting the vise section to the bracket section is a connecting bolt threaded into a hole in the mating face of the vise section and projecting through the elongated slot to permit rotation of the vise section through 360 degrees relative to the bracket section while the bracket section is securely clamped to the work surface.

10. A clamping device as set forth in claim 9, further including a protractor inscribed on the mating surface of the vise section, in order that a desired angular relationship between the vise section and the bracket section may be easily and accurately obtained.

11. A clamping device as set forth in claim 2, wherein the second and fourth flat surfaces of the vise section each forms a continuous plane surface with a side surface of the bracket section when the vise and bracket sections are clamped together with the first flat surface resting on the work surface.

* * * * *